United States Patent
Jindal

(10) Patent No.: US 7,835,503 B2
(45) Date of Patent: Nov. 16, 2010

(54) SYSTEMS AND METHODS OF ADDING ATTACHMENTS TO VOICE CALLS OVER A CIRCUIT-BASED NETWORK

(75) Inventor: Dinesh K. Jindal, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1179 days.

(21) Appl. No.: 10/951,202

(22) Filed: Sep. 27, 2004

(65) Prior Publication Data

US 2006/0072717 A1    Apr. 6, 2006

(51) Int. Cl.
*H04M 1/64*    (2006.01)
(52) U.S. Cl. .................. 379/68; 379/88.13; 379/88.23; 370/352
(58) Field of Classification Search ............ 379/114.13, 379/221.14, 68, 88.14, 207.02, 88.25–88.27, 379/88.21–88.23; 709/224; 370/260, 352; 455/412.2; 705/2
See application file for complete search history.

(56) References Cited

U.S. PATENT DOCUMENTS

| | | | |
|---|---|---|---|
| 5,991,290 A * | 11/1999 | Malik ........................ | 370/352 |
| 5,991,301 A | 11/1999 | Christie | |
| 6,262,992 B1 | 7/2001 | Nelson et al. | |
| 6,977,993 B2 * | 12/2005 | Starbuck et al. .......... | 379/88.21 |
| 7,224,788 B1 * | 5/2007 | Rhee et al. ............. | 379/207.02 |
| 2003/0147357 A1 * | 8/2003 | Zhang et al. ................ | 370/260 |
| 2004/0022371 A1 * | 2/2004 | Kovales et al. ................ | 379/68 |
| 2005/0060200 A1 * | 3/2005 | Kobylevsky et al. ........... | 705/2 |
| 2006/0026277 A1 * | 2/2006 | Sutcliffe ..................... | 709/224 |
| 2006/0083360 A1 * | 4/2006 | Moore et al. ............. | 379/88.14 |

* cited by examiner

*Primary Examiner*—MD S Elahee
(74) *Attorney, Agent, or Firm*—Duft, Bornsen & Fishman, LLP

(57) ABSTRACT

Systems and methods are disclosed for adding attachments to voice calls. A communication system for the invention includes a file server and a switching system of a circuit-based network. During a voice call connected between a first station and a second station over the circuit-based network, the switching system detects a code entered by the user of the first station. Responsive to detecting the code, the switching system transmits a query to the file server. The file server processes the query to locate one or more files stored in the file server. The file server then transmits the located file to the switching system. The switching system plays the file to the second station over the connection for the voice call.

20 Claims, 3 Drawing Sheets

SYSTEMS AND METHODS OF ADDING ATTACHMENTS TO VOICE CALLS OVER A CIRCUIT-BASED NETWORK

BACKGROUND OF THE INVENTION

1. Field of the Invention

The invention is related to the field of voice communications, and in particular, to systems and methods of adding attachments to voice calls over a circuit-based network.

2. Statement of the Problem

In data communications such as email, a sender of emails can easily reuse information, data, files, etc, in multiple emails. The sender can reuse data by adding attachments to each of the emails to be viewed by the recipients. For instance, the sender can attach one or more files to each of the emails. Also, the sender can add a hyperlink to each of the emails that navigates the recipients to desired files. Adding attachments to emails in this manner allows the sender to provide the recipients with the desired information without the sender having to manually enter the information in each of the emails.

Unfortunately, current voice communication services over a circuit-based network do not provide a similar feature of reusing information by adding attachments to voice calls. When a calling party places a voice call to a called party, the calling party conveys information to the called party by speaking the information. If the calling party wants to convey the same information multiple times to the same called party or to multiple called parties, the calling party has to speak the same information each time.

Voice mail services allow a voice mail subscriber to reuse information in limited circumstances. The subscriber records information in a message and the message is played to callers that reach the voice mail system. They provide entire messages to play when the phone is not answered, but don't provide a mechanism where one can insert a number of pre-recorded messages anywhere during a live call. A problem remains that voice callers using a circuit-based network cannot reuse information for multiple calls by adding attachments to the calls.

SUMMARY OF THE SOLUTION

The invention solves the above and other related problems with systems and methods that provide for adding attachments to voice calls over a circuit-based network. The attachments added herein comprise audio files that are played over a connection for an active voice call. A user of a station (e.g., a traditional telephone) may designate which files are played over the connection to a receiving station by entering a code.

One embodiment of the invention is a communication system that includes a file server and a switching system of a circuit-based network. The switching system connects a voice call between a first station and a second station over a connection of the circuit-based network. During the voice call, a user of the first station enters a code into the first station. The switching system detects the code transmitted over the connection of the voice call. Responsive to detecting the code, the switching system generates a query and transmits the query to the file server. The file server stores a plurality of files. The file server processes the query from the switching system to locate one or more files stored in the file server. The file server then transmits the located file to the switching system. The switching system receives the file from the file server and plays the file to the second station over the connection for the voice call.

In another embodiment, while the switching system plays the file over the connection, communication between the first station and the second station is interrupted so as to not interfere with the playing of the file. When the switching system begins playing the file over the connection to the second station, the switching system also transmits an indicator to the first station that the file has begun being played. The switching system then plays an advertisement, music, or some other audio stream to fill the dead time when the switching system is playing the file to the second station. When the switching system has finished playing the file over the connection to the second station, the switching system transmits another indicator to the first station that the file has finished being played. Communication between the first station and the second station may then continue over the connection.

The communication system described above advantageously allows a user of the first station to add attachments to the voice call in real-time. Through the code entered into the first station, the user can instruct the switching system to play one or more files to the second station. The user can reuse the files for any number of voice calls and avoid having to speak the information contained in the file for each call. Another advantage of this invention is better utilization of the real-time functions of the switching system. The switching system only receives the code over an incoming portion of the switching system, while playing one or more files over an outgoing portion of the switching system. Thus, the incoming portion of the switching system is freed of real time usage during the playing of the file.

The invention may include other exemplary embodiments described below.

DESCRIPTION OF THE DRAWINGS

The same reference number represents the same element on all drawings.

DETAILED DESCRIPTION OF THE INVENTION

Figure 1:
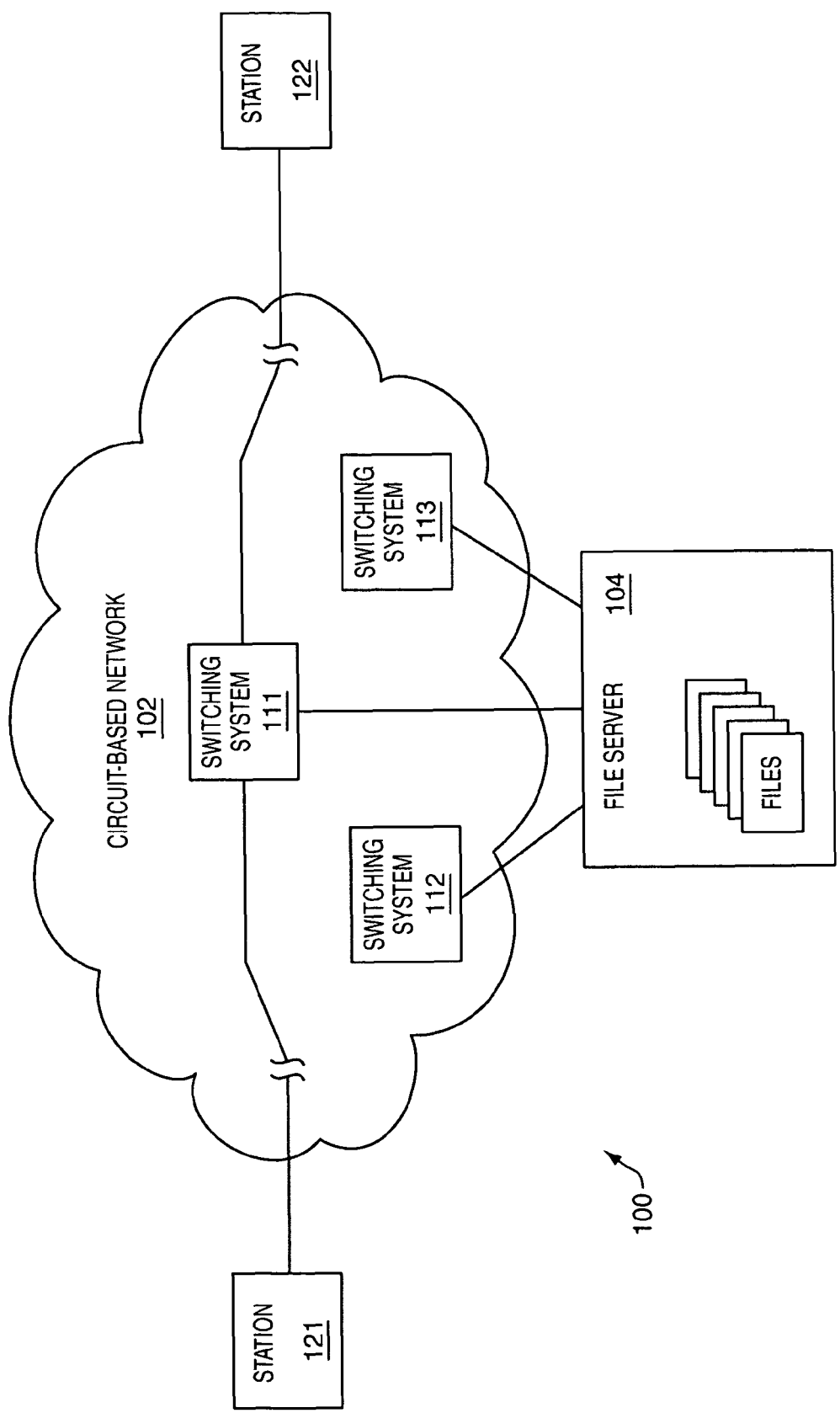
FIG. 1 illustrates a communication system in an exemplary embodiment of the invention.
Figure 2:
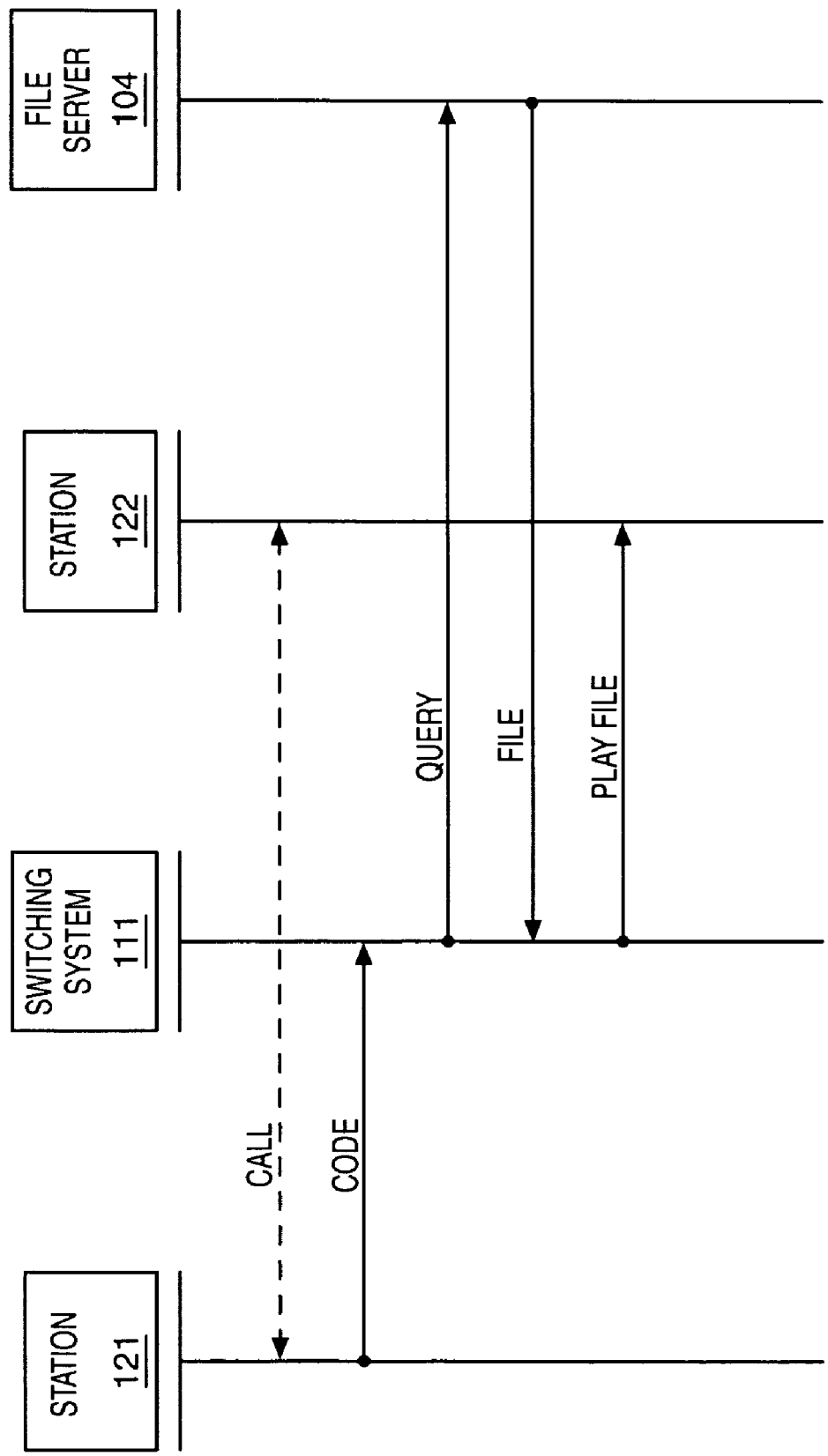
FIG. 2 is a message diagram illustrating one example of operation of the communication system of FIG. 1 in an exemplary embodiment of the invention.
Figure 3:
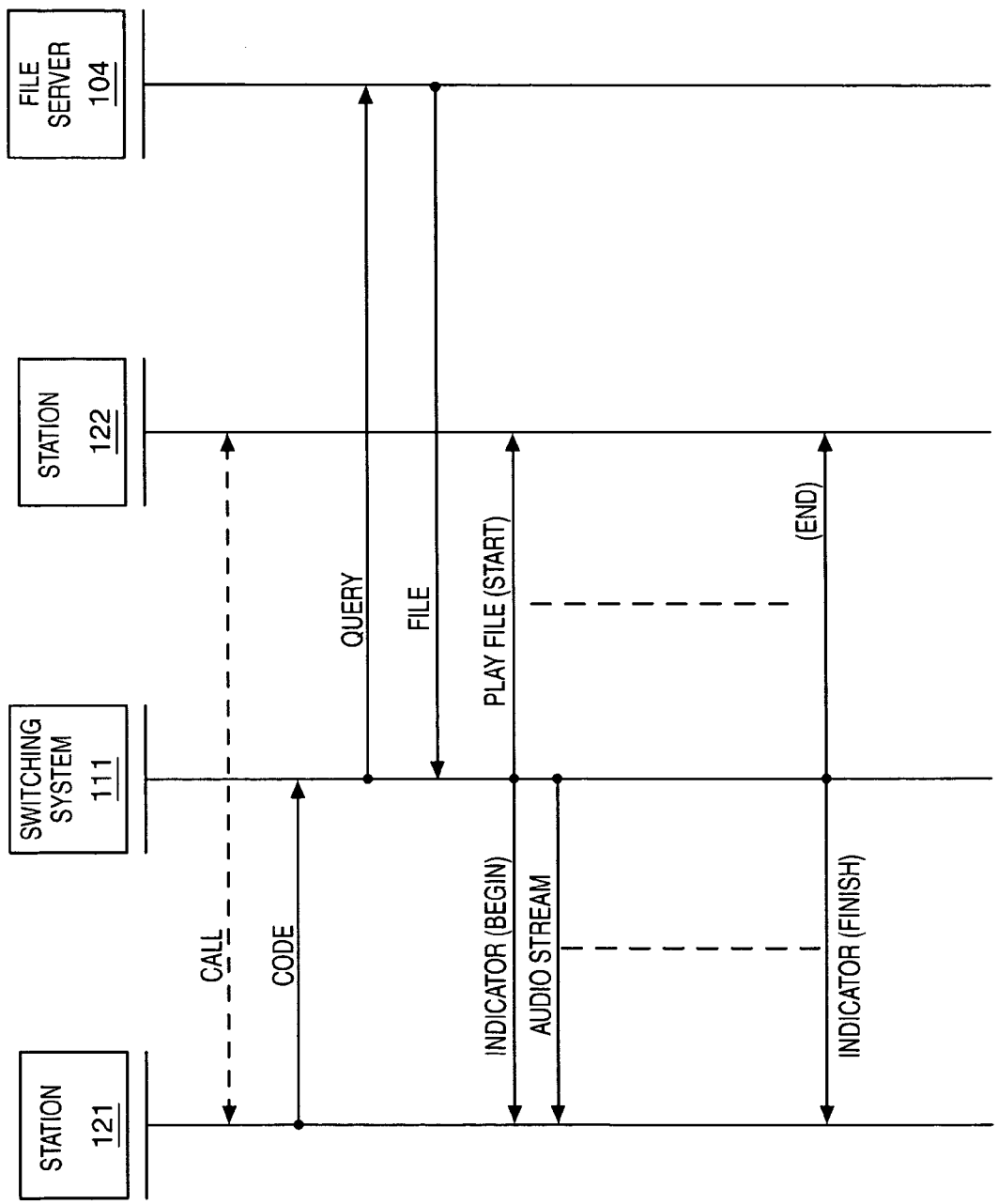
FIG. 3 is a message diagram illustrating further operation of the communication system of FIG. 1 in an exemplary embodiment of the invention.

FIGS. 1-3 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

FIG. 1 illustrates a communication system 100 in an exemplary embodiment of the invention. Communication system 100 includes a circuit-based network 102 and a file server 104. Circuit-based network 102 includes a plurality of switching systems 111-113 each connected to file server 104. Switching system 111 is also connected to station 121 and station 122 to connect a voice call between station 121 and station 122 over a connection of circuit-based network 102.

There may be other devices or systems on the connection between station 121, switching system 111, and station 122 that are not shown for the sake of brevity. Communication system 100 and circuit-based network 102 may include other devices or systems not shown in FIG. 1.

A circuit-based network comprises any network that switches voice calls over circuits, such as a traditional telecommunications network. A switching system comprises any device or system that switches voice calls in a circuit-based network, such as a traditional telecommunications switch. A station comprises any device capable of placing or receiving a voice call over a circuit-based network, such as a traditional telephone. A file server comprises any device, system, or server that stores files. One example of a file server in this embodiment is a Service Control Point (SCP) of a telecommunications network. Another example of a file server is a content server on the Internet or a content server on a public or private intranet. Although file server 104 is shown as being outside of circuit-based network 102, file server 104 may be part of circuit-based network 102, such as when an SCP in circuit-based network 102 comprises file server 104.

FIG. 2 is a message diagram illustrating one example operation of communication system 100 in an exemplary embodiment of the invention. In FIG. 2, a voice call is connected between station 121 and station 122. During the voice call, a user of station 121 enters a code into station 121. The particular code entered by the user is an instruction to add one or more files to the voice call. Assume at this point that the user knows what code to enter to add particular files. The user may enter the code via a touch-tone keypad on station 121 in the form of Dual Tone Multiple Frequency (DTMF) tones. Station 121 transmits the code over the connection of the voice call.

Switching system 111 detects the code transmitted over the connection of the voice call. For instance, switching system 111 may be configured to detect DTMF tones on the connection during an active voice call. Responsive to detecting the code, switching system 111 generates a query and transmits the query to file server 104. Switching system 111 may include some of the data included in the code in the query. For instance, the code may include a file identifier and/or a file server identifier that switching system 111 includes in the query.

File server 104 stores a plurality of files. The files may be audio files such as .wav or .ram files, or text files such as .txt files. File server 104 processes the query from switching system 111 to locate one or more files of the plurality of files. For instance, the query may include one or more file identifiers that file server 104 uses to identify the desired files. Assume for this embodiment that one file is located. File server 104 transmits the located file to switching system 111.

Switching system 111 receives the file from file server 104. Switching system 111 then plays the file to station 122 over the connection for the voice call. If the file comprises an audio file, then switching system 111 plays the audio file to station 122 over the connection for the voice call. If the file comprises a text file, then switching system 111 converts the text file to an audio file and plays the audio file to station 122 over the connection for the voice call.

Communication system 100 advantageously allows a user of station 121 to add attachments to an active voice call in real-time. Through the code entered into station 121, the user can instruct switching system 111 to play one or more files to station 122 during the voice call and during other voice calls. The user can reuse the files for any number of voice calls and avoid having to speak the information contained in the file for each call.

FIG. 3 is a message diagram illustrating further operation of communication system 100 in an exemplary embodiment of the invention. While switching system 111 plays the file to station 122 over the connection, communication between station 121 and station 122 may be interrupted so as to not interfere with the playing of the file. In this embodiment, when switching system 111 begins playing the file over the connection to station 122, switching system 111 also transmits an indicator to station 121 that the file has begun being played. The indicator may be a tone or an announcement. This leads to lower real-time consumption over the incoming portion of switching system 111.

Switching system 111 may then play an advertisement, music, or some other audio stream to fill the dead time when switching system 111 is playing the file to station 122. For instance, the service provider providing the telephone service may sell advertising to play during this dead time, or play their own advertising. When switching system 111 has finished playing the file over the connection to station 122, switching system 111 transmits another indicator to station 121 that the file has finished being played. This indicator may again be a tone or an announcement. When switching system 111 has finished playing the file over the connection, communication between station 121 and station 122 may continue over the connection.

The code used in the above embodiments may have any desired format. One exemplary format of the code is as follows:

[start ID] [file server ID] [file ID] . . . [end ID]

The start ID indicates the beginning of the code. The start ID is also a trigger for switching system 111 to start the file service (i.e., the process of adding the file to the voice call). The file server ID indicates to switching system 111 which server contains the desired file. The file server ID may comprise an identification code, an address, or some other identifier. The file ID indicates to switching system 111 which file is desired in the file server. The file ID may comprise a file name, a file code, or some other identifier. There may be multiple file server IDs and file IDs to support playing multiple files. The end ID indicates the end of the code.

The IDs may be numbers, letters, or special characters. The file server ID and the file ID may be integrated into a single ID. For instance, the file server ID and the file ID may comprise a Uniform Resource Locator (URL) that designates both the server and the file.

The following examples illustrate actual codes that may be used.

Example #1

In this example, assume that file server 104 comprises an SCP of the service provider providing the telephone service. As part of the file service offered by the service provider, the subscriber to the file service creates audio or text files and sends the files to the service provider. The subscriber may contact the service provider over the phone, via a web site, etc. The service provider then stores the files in the SCP.

The service provider also creates a code that is provided to the subscriber. In this example, the service provider labels the start ID as "*0" and the end ID as "*9". The service provider labels the file server ID for the SCP as "01". The service provider labels the files provided by the subscriber and stored in the SCP as follows: file 1 is labeled "10", file 2 is labeled "20", and file 3 is labeled "30".

Assume during a voice call, the subscriber enters the following code via the touch-tone keypad:

*0 01 10 *9

This code instructs switching system 111 that the file to be added to the voice call is stored in the SCP, and that file 1 is to be played.

Further assume that during another instance, the subscriber enters the following code:

*0 01 10*# 01 30 *9

The code "01 10" instructs switching system 111 that one of the files to be added to the voice call is stored in the SCP, and that file 1 is to be played. The code "*#" indicates that another file is to be added. The code "01 30" instructs switching system 111 that another file to be added is also stored in the SCP and that file 3 is also to be played.

Example #2

In this example, assume that file server 104 comprises a content server on the Internet. The content server stores files that are accessible to the public via the Internet. Assume during a voice call, the subscriber enters the following code via the touch-tone keypad:

*0 02 www.cnn.com/file1 *9

This code instructs switching system 111 that the file server is a URL (02) and is accessible at www.cnn.com. The code also instructs switching system 111 that the file is labeled "file1" (i.e. the complete URL is www.cnn.com/file1).

The service provider also designates how the code is entered via a touch-tone keypad. One way to enter letters, numbers, and special characters over the keypad is to enter two digits for each letter, number, or special character. For numbers, the first digit is a zero followed by the digit. For instance, "00" represents a zero, "01" represents a one, "02" represents a two, etc. Most keypads have letters on the digits. The letters are entered as the digit followed by a "1", "2", "3", or "4" depending on whether it's the first, second, third, or fourth letter on that digit. For instance, "21" represents an A, "22" represents a B, "23" represents a C, "31" represents a D, "32" represents an E, "33" represents an F, etc. For special characters, any other two-digit code is used that is not already being used for number or letters. For instance, "11" represents the "@" character, "12" represents the ":" character, "13" represents the "\" character, etc.

I claim:

1. A communication system for adding attachments to voice calls, the communication system comprising:
    a file server that stores a plurality of files; and
    a switching system of a circuit-based network that connects an active voice call that is set up between a first station and a second station over a connection of the circuit-based network, the switching system detects a code entered by a user of the first station during the active voice call and after call set up that includes a file identifier, and transmits a query to the file server responsive to detecting the code, wherein the code is an instruction to add a file to the voice call;
    the file server processes the query to locate the file in the plurality of files that corresponds with the file identifier, and transmits the file to the switching system;
    the switching system, responsive to receiving the file, plays the file to the second station over the connection during the active voice call.

2. The communication system of claim 1 wherein:
    the switching system interrupts communication between the first station and the second station, and transmits an indicator to the first station that the file has begun being played to the second station.

3. The communication system of claim 2 wherein:
    the switching system plays an advertisement to the first station while the file is being played to the second station.

4. The communication system of claim 3 wherein:
    the switching system transmits an indicator to the first station that the file has finished being played to the second station, and allows communication between the first station and the second station to continue.

5. The communication system of claim 1 wherein the file server comprises a Service Control Point (SCP).

6. The communication system of claim 1 wherein the file server comprises a content server on the Internet or an intranet.

7. The communication system of claim 1 wherein the code further includes a file server identifier that identifies the file server storing the file.

8. The communication system of claim 7 wherein the file server identifier and the file identifier comprise a Uniform Resource Locator (URL).

9. The communication system of claim 1 wherein the file comprises an audio file or a text file.

10. The communication system of claim 9 wherein:
    if the file comprises a text file, then the switching system converts the text file into an audio file.

11. A method of adding attachments to voice calls in a communication system, the communication system comprising a file server that stores a plurality of files and a switching system of a circuit-based network, wherein the switching system connects an active voice call that is set up between a first station and a second station over a connection of the circuit-based network, the method comprising the steps of:
    detecting, in the switching system, a code entered by a user of the first station during the active voice call and after call set up that includes a file identifier, wherein the code is an instruction to add a file to the voice call;
    transmitting a query from the switching system to the file server responsive to detecting the code;
    processing the query in the file server to locate the file in the plurality of files that corresponds with the file identifier;
    transmitting the file from the file server to the switching system; and
    playing the file from the switching system to the second station over the connection during the active voice call.

12. The method of claim 11 further comprising the step of:
    interrupting communication between the first station and the second station; and
    transmitting an indicator from the switching system to the first station that the file has begun being played to the second station.

13. The method of claim 12 further comprising the step of:
    playing an advertisement from the switching system to the first station while the file is being played to the second station.

14. The method of claim 13 further comprising the step of:
    transmitting an indicator from the switching system to the first station that the file has finished being played to the second station; and
    allowing communication between the first station and the second station to continue.

15. The method of claim 11 wherein the file server comprises a Service Control Point (SCP).

16. The method of claim 11 wherein the file server comprises a content server on the Internet or an intranet.

17. The method of claim 11 wherein the code further includes a file server identifier that identifies the file server storing the file.

18. The method of claim 17 wherein the file server identifier and the file identifier comprise a Uniform Resource Locator (URL).

19. The method of claim 11 wherein the file comprises an audio file or a text file.

20. The method of claim 19 wherein if the file comprises a text file, then further comprising the step of:
 converting the text file into an audio file in the switching system.

* * * * *